INVENTORS
TODD L. RACHEL
THEODORE K. RIGGEN
DAVID S. VAUGHAN

BY Robert A. Benziger
ATTORNEY

3,625,080
TRANSMISSION SYNCHRONIZING AND SHIFT
CONTROL SUPERVISORY SYSTEM
Todd L. Rachel, Elmira, David S. Vaughan, Erin, and
Theodore K. Riggen, Elmira, N.Y., assignors to The
Bendix Corporation
Filed Nov. 24, 1969, Ser. No. 879,483
Int. Cl. F16h 3/38, 5/42; B60k 17/02
U.S. Cl. 74—336                                  5 Claims

ABSTRACT OF THE DISCLOSURE

A control system for a mechanical power transmission to provide synchronization of gear speeds to thereby permit automatic gear changing in response to a desired gear selection. The system includes anticipation circuitry to provide the control system with a signal indicative of synchronization sufficiently in advance of actual synchronization to compensate for response time delays in the remainder of the system and in the shifting mechanism. Further circuitry is provided to inhibit the system if the desired gear change would not be compatible with best operation of the associated prime mover. The shift inhibit circuitry is provided with means for recognizing the error in gear selection and with means for correcting the error by attempting to select a proper gear setting. A shift lever mechanism operative to be self-disabling in the event of a down shift to a prohibited position and further operative to seek the nearest permitted position is also shown. The lever mechanism includes biasing means operative to bias the gear indicating lever toward the highest gear settings and latching means operative to be energized at gear settings lower than the lowest permitted setting to prevent the lever mechanism, and hence, the associated system input means, from commanding a prohibited down shift.

BACKGROUND OF THE INVENTION

Field of the invention

The present invention relates to the field of transmission controls for controlling the transmission of mechanical power from a prime mover to a utilization means. The control system is of particular utility in the control of transmissions in motor vehicles.

Prior art

The field of transmission controls for gear-type transmissions teaches that shifting from one gear to another requires that gear speeds in the shifted-to gear setting be synchronized to avoid damage to the gear teeth. In the past this has been accomplished in two ways. The first required a shift into neutral, an adjustment of the speed of the associated prime mover, and a shift into the desired gear. This is known as "double-clutching." More recently, the transmission gears have been provided with cone clutches which serve to speed the slower gear up to synchronization ("synch") immediately prior to meshing of the gear teeth. While the former method is effective, it requires great skill and dexterity and in today's traffic it rapidly tires the most able drivers. The latter method is less tiring and requires less driving skill but causes the complexity of transmission to be greatly increased and requires highly skilled mechanics to maintain proper adjustment of the cone clutches. In heavy duty motor vehicles (trucks, etc.) the transmissions may provide as many as eight (8) different gear combinations (and fifteen different power transfer ratios). It will be readily apparent that a simpler and more effective system would be of great benefit. It has been proposed to provide automatic shifting of gears in such transmissions in response to signals indicative of (1) desired change in gear setting and (2) synchronization of gear speeds. It has further been proposed to synchronize gear speeds by varying the speeds of the transmission shafts which carry the transmission gears. It is, therefore, an object of the present invention to provide a control system for a transmission having such a means for synchronizing gears.

Such a control system would require that the synch signal be generated sufficiently in advance of actual synch to compensate for the various delays in the remainder of the control system as well as in the shifting means. Furthermore, the signal indicative of imminent synch would have to be produced only during an actual gear change operation to avoid the possibility of undesired gear change. It is, therefore, an object of the present invention to provide a transmission shift control having synch anticipation means. It is a still further object of the present invention to provide a transmission shift control synch anticipation means which is reliable in operation. Since a convenient means for synchronization determination is a simple speed comparison, it is a still further object of the present invention to provide a circuit for comparing shaft speeds, operating on a means for causing the shaft speeds to seek synchronization and modifying the comparison to provide a signal indicative of synch which is sufficiently in advance of actual synch to compensate for time delays between the signal and the shift.

Such a transmission as discussed hereinabove would be simple and reliable to operate but in a practical sense, it would be too simple in that it would be readily possible to shift into a gear setting which would be intolerable or overtaxing for the associated prime mover. It is, therefore, a further object of the present invention of providing a means of correcting a "prohibited" shift. In this context, "prohibited" shift means a shift which would produce a power transfer ratio incompatible with best engine operation. Since the most dangerous prohibited shift would be one which excessively overspeeds the prime mover, as by a down shift (shift to a lower gear) when the vehicle has a high rate of speed, it is a specific object of the present invention to provide a shift inhibit circuit and means to correct a prohibited downshift which would overspeed the prime mover. For the purposes of this application, synchronization means that a pair of shafts are rotating at speeds such that the speed of one of the shafts is within a predetermined percentage of the speed of the other shaft.

SUMMARY OF THE PRESENT INVENTION

The present invention provides a synchronizing and shift control system which meets the above-noted objectives and which is operative to control the shifting of a mechanical power transmission. The system receives input signals indicative of the shaft speeds of the transmission, modified for a selected gear and is active to cause shift control logic to place the transmission in the selected gear setting. The transmission shift control includes circuitry to anticipate synch and additional circuitry to recognize and prevent a prohibited shift. The circuitry to prevent a prohibited shift is operative to control the gear selection means so as to seek a gear setting which would be closest in power transfer ratio to the desired (prohibited) gear setting but which would not constitute a prohibited shift.

The anticipatory circuit is used to control a threshold detector, in the form of an emitter-coupled pair of transistors, which compares signals representative of transmission shaft speeds, which signals are suitably modified to represent specific gear settings and the anticipation of synch. Accelerating and braking devices coupled to the shafts are controlled by signals produced prior to synchronization.

The shift inhibitor compares the gear-adjusted speed of the output shaft against a selected value to determine if the shift is permissible. If not permissible, the control system remains inactive and a means is activated to change the gear setting to one which is permissible.

DETAILED DESCRIPTION OF THE PRESENT INVENTION

Figure 1:
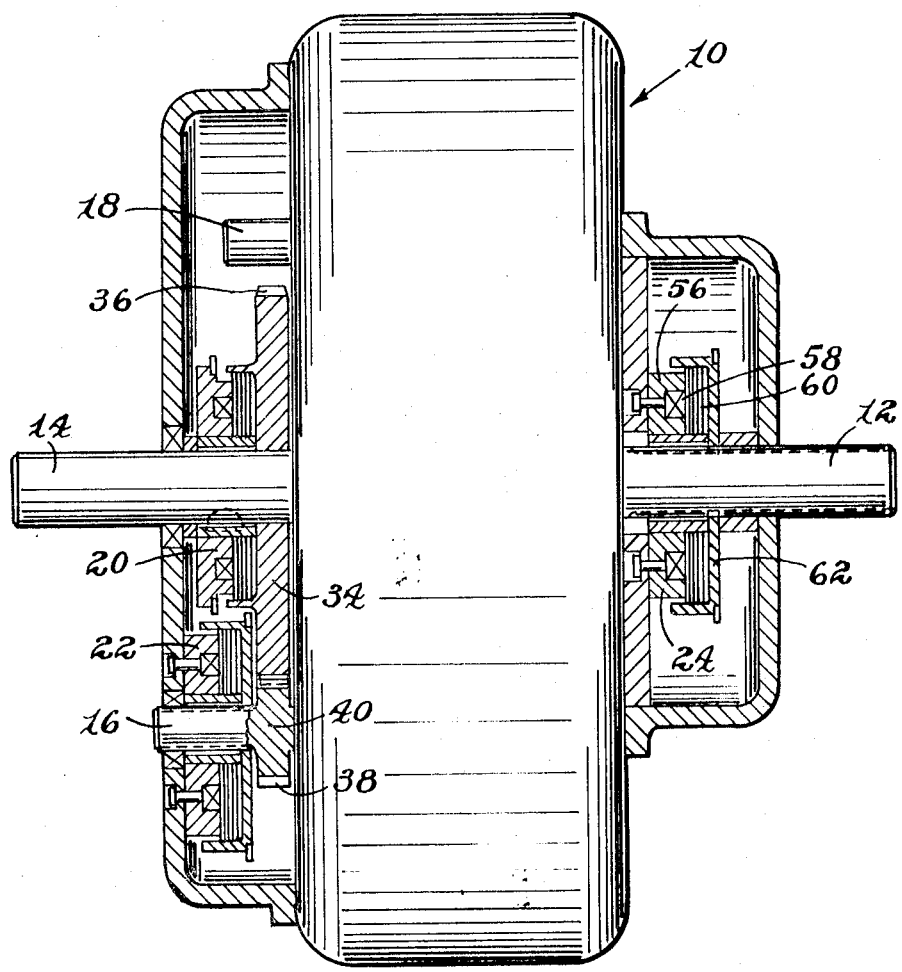
FIG. 1 shows a transmission, in elevation, with the accelerating and braking devices to facilitate synchronization of the transmission shafts prior to a gear change shown in a sectional view.

FIG. 1 shows a motor vehicle type power transmission 10 having an input shaft 12, an output shaft 14 and a counter-shaft means which, in this instance, includes two counter-shafts 16 and 18. Power is transmitted from the input shaft 12 to the output shaft 14 via a plurality of gear connections between the input shaft 12 and the counter shafts 16, 18 and between the counter-shafts 16, 18 and the output shaft 14. For instance, in a three-speed transmission there could be a single connection between the input shaft 12 and the counter-shafts 16, 18 and three differently-ratioed gear connections available between the counter-shafts 16, 18 and the output shaft 14. It will be understood that in order to change the power transfer ratio in the case of a ten-speed transmission it might be necesesary to change two gear ratios thereby requiring that all three shaft groups be synchroized. In this embodiment, the synchronization is obtained by de-clutching the input shaft 12 from the source of power, not shown, which could be an interal combustion engine or other prime mover, and by the drawing rotary power from the output shaft 14 which is selectively coupled to the counter-shaft 16. To achieve this, the shaft 14 has coupled thereto an accelerating device in the form of electromagnetic clutch 20. Deceleration for shaft 16 is provided in the form of a decelerating device shown as electromagnetic brake 22 and shaft 12 has a decelerating device in the form of electromagnetic brake 24.

Figure 2:
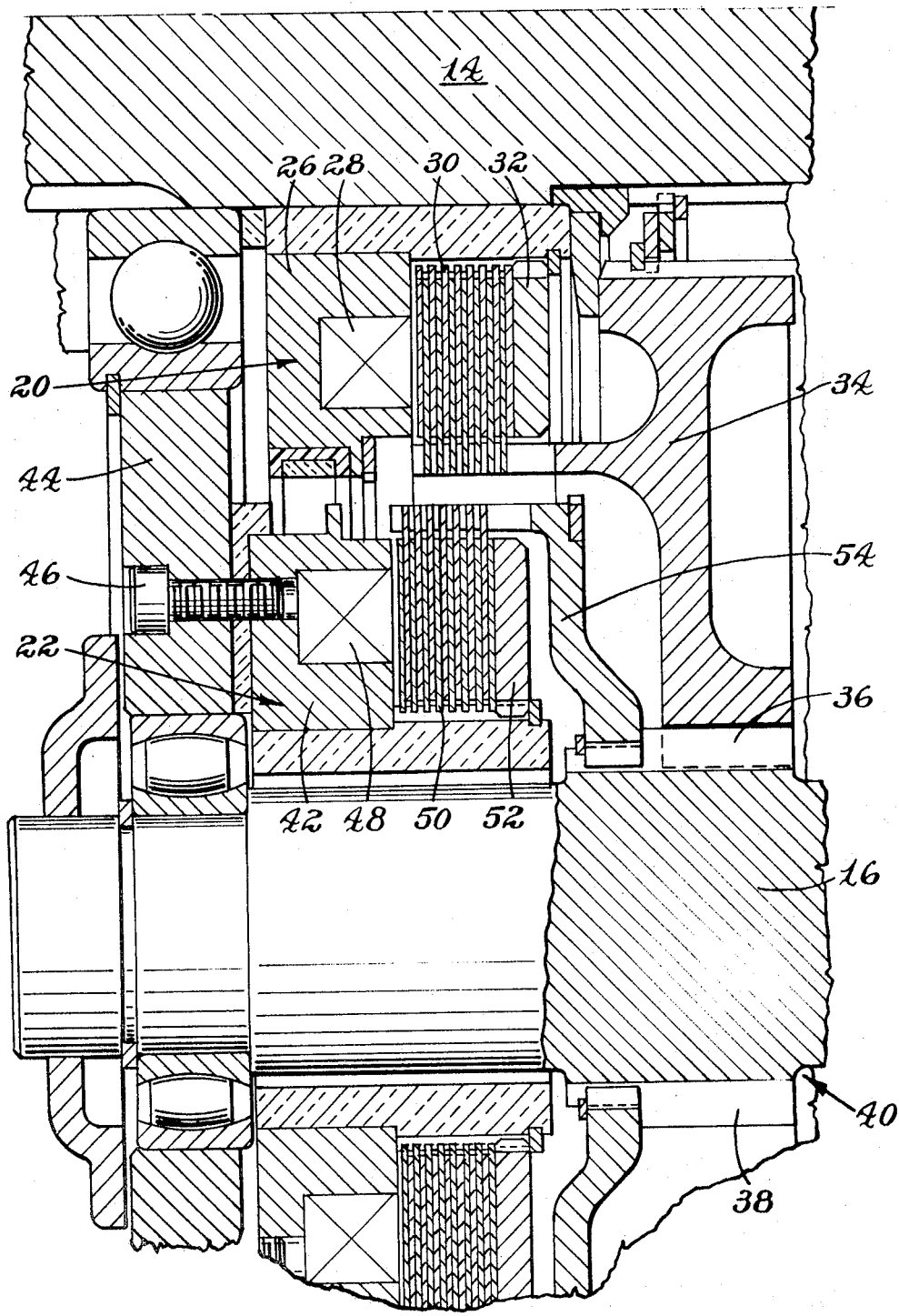
FIG. 2 shows, in an enlarged sectional view of a portion of FIG. 1, the interrelation between two of the accelerating and braking devices.

With reference to FIGS. 1 and 2 the operation of accelerating and decelerating devices 20, 22 will be described. When it is determined that counter-shaft 16 is rotating too slowly for synchroization with output shaft 14 at a selected gear ratio the accelerating device 20 is energized. This device is show in FIG. 2 as a multi-disk electromagnetic clutch having a magnet body 26 which is coupled to shaft 14 for contemporaneous rotation therewith, electromagnetic coil 28, disk pack 30, armature means 32, and output member 34. Output member 34 is arranged to be rotated with shaft 14 only upon energization of the coil 28 and subsequent compression of the disk pack. Electromagnetic devices of this type are known in the art, for instance U.S. Letters Patent 2,957,562, reference to which may be had for a further explanation for the operation of this device. Other selectively energizable clutches are known and these devices are also suitable. Output member 34 includes on its outer periphery a plurality of gear teeth 36 which are arranged to mesh with mating teeth 38 on gear member 40 which is formed integrally with shaft 16. It will be apparent that energization of accelerating device 20 will establish a connection between shaft 14 and shaft 16 which, depending upon the ratio of teeth 36 and 38 and the amount of compression of disk pack 30, will serve to accelerate shaft 16. By controlling duration of energization of device 20, acceleration of shaft 16 into synchronization speed with shaft 14 is possible. By synchronization is meant that the ratio of speeds between the shafts will permit establishment of a selected gear connection therebetween.

Decelerating or braking device 22 is comprised of a magnet body 42 which is coupled directly to the housing 44 of the transmission 10 by suitable means such as bolts 46 and includes electromagnetic coil 48, disk pack 50, and armature member 52. Compression of disk pack 50 upon energization of the coil 48 will serve to establish a non-rotary connection between the housing 44 and the shaft 16 via the output member 54. Thus, when it is determined that shaft shaft 16 is rotating too rapidly for synchronization of speed with shaft 14, braking device 22 can be momentarily energized to decelerate shaft 16 down to synchronous speed.

Braking device 24 is comprised of magnet body 56 which is attached to the housing, electromagnetic coil 58, disk pack 60, and output member 62 and operates in the same fashion with regard to the input shaft 12 as does braking device 22 with regard to shaft 16.

In operation, a gear selection requiring a change in the input shaft 12/counter-shaft 16 connection as well as a change in the countershaft 16/output shaft 14 connection would first require synchronization of the speeds of the input shaft 12 with the counter-shaft 16. This would be achieved by selectively braking the more rapidly turning shaft through its associated decelerating device 22, 24. When the gear change has been made, the speeds of the output shaft 14 and the counter-shaft 16 would then be synchronized by either accelerating or decelerating the counter-shaft 16 through use of the appropriate accelerating or decelerating device 20, 22. Energization of accelerating device 20 will establish a gear connection between output shaft 14 and counter-shaft 16 which will serve to accelerate countershaft 16. Output shaft 14 is, of course, constantly turning due to its connection with the driving wheels of the vehicle which must be presumed to be turning. On the otherhand, if output shaft 14 is turning slower than counter-shaft 16, it will be desired to decelerate counter-shaft 16 which can be readily accomplished by momentary energization of braking device 22. In most instances, the necessary shaft speed changes will be accomplished by momentary energization of the appropriate accelerating or decelerating device 20, 22 or 24. It would, of course, be possible to arrange the accelerating and braking devices 20, 22, 24 on different shafts or in different locations to achieve the desired functions. The present invention is, therefore, not intended to be limited in application to the specific configuration of devices in FIGS. 1 and 2.

Figure 3:
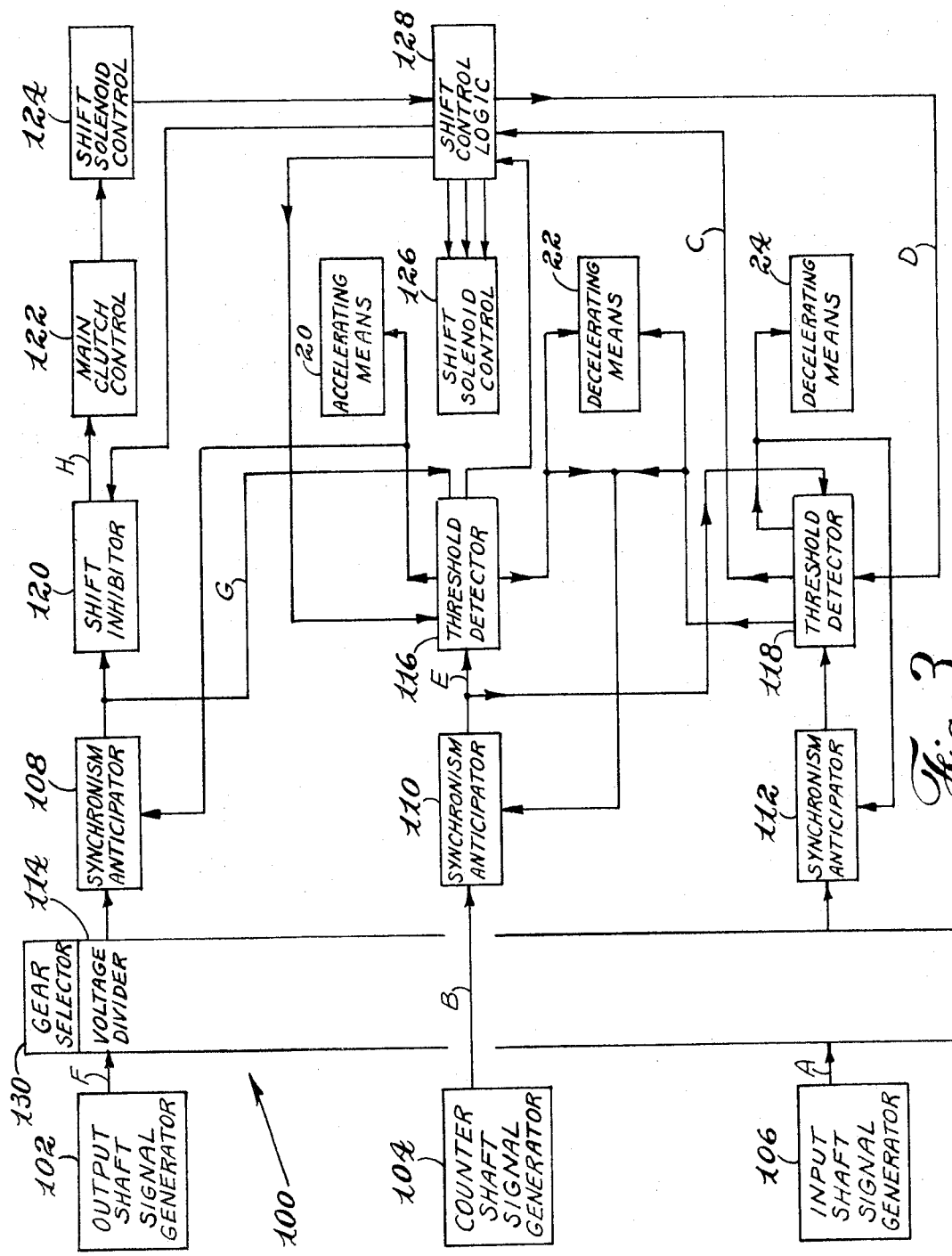
FIG. 3 shows a block diagram representation of the control system according to the present invention for controlling the accelerating and braking devices of the FIG. 1 embodiment.

With reference to FIG. 3, the control circuit for the transmission 10 is shown generally, in block diagram form, as 100. The circuit 100 includes generator means for producing signals indicative of transmission shaft speeds 102, 104 and 106, which signals are applied to a plurality of synchronism anticipators 108, 110 and 112. The signals from generator means 102 and 106, which indicate output shaft speed and input shaft speed, are modified by a voltage divider 114 to take into account the transmission gear setting. The circuit also includes a pair of threshold detectors 116 and 118, which interconnect with the three acceleration and deceleration devices 20, 22 and 24. The circuit is further comprised of a shift inhibitor 120, main clutch control means 122, shift solenoid control means 124 and 126 and shift control logic means 128.

Operation

The operation of the circuit 100 will be described assuming that the transmission 10 is in use and has been in a selected gear for a period of time. The synchronism anticipators 108, 110 and 112 have been disabled as are the accelerating and braking devices 20, 22 and 24 and the threshold detectors 116 and 118. Upon the occurrence of a change in selected gear, or a shift, by the operator, the voltage divider which is controlled by the gear selector 130 will have its setting adjusted so that the signals applied to the synchronism anticipators 108 and 112, are changed. The anticipators 108, 110 and 112 will remain disabled and the signal from anticipator 108 will be applied to the shift inhibitor 120 and all signals will be applied to the appropriate threshold detectors 116 and 118. The threshold detectors 116 and 118 will, for the moment, remain disabled and shift inhibitor 120 will determine if the gear change is permissible.

Assuming the gear change to be permissible, the circuit 100 will disengage the main clutch, not shown (between the prime mover, not shown, and the transmission 10), due to main clutch control means 122, deenergize the shifting solenoids through shift control means 124 and will inform the shift control logic means 128 that the desired gear change may be made. Before the change may be made, the transmission logic causes the shift control means 126 to shift the transmission 10 into the neutral or idling state. The shift control logic means 128 will then produce a signal to be applied to threshold detector 118 to enable the detector to compare the shaft speeds of the input shaft 12 and the counter-shafts 16 and 18 to determine which is spinning fastest. When the determination is made, the threshold detector 118 will generate a signal to energize the braking device 22, 24 associated with the shaft having the higher speed and to enable the synchonism anticipator 110, 112 associated with the higher speed shaft so that the signal which is applied to the threshold detector 118 by that anticipator will reflect the shaft speed change with the desired anticipation.

When the threshold detector 118 senses imminent synchronization, it will so inform the shift control logic means 128 which will, in turn, disable the threshold detector 118 and energize that portion of the shift solenoid control means 126 required to accomplish the first phase of the shifting operation. This portion of the transmission control circuit 100 relating to the synchronization of the input and counter-shafts is applicable to those transmissions having a selectable gear connection therebetween. The remainder of the above description, as well as that which follows, is of general application to transmissions having selectable gear interconnections between the counter-shafts and the output shaft.

When the shifting of the desired input shaft 12/counter-shaft 16 gear has been completed, the shift control logic means will then enable threshold detector 116 which will then repeat the comparison operation for the output shaft 14/counter-shaft 16 gear connection, as described hereinabove with reference to threshold detector 118. That is, threshold detector 116 will compare the shaft speeds of output shaft 14 and counter-shaft 16. If the output shaft is turning faster, the accelerating device 20 will be energized to accelerate counter-shaft 16 up to synch speed. The synch anticipator 108 will then be active to adjust the speed signal from output shaft 14. If the counter-shaft 16 is rotating faster than the output shaft 14, the braking device 22 will be energized to slow the rate of speed of the counter-shaft 16 while synch anticipator 110 will be active to anticipate synchronism. When anticipated synch is reached, the shift control logic means 128 will be so informed, the threshold detector 116 will be disabled and the appropriate shift operation will be signaled to the shift solenoid control means 126. Upon completion of the final shift operation, the shift inhibitor will be reset and the main clutch, not shown, will be reengaged. The synch anticipators 108, 110, 112 and the threshold detectors 116 and 118 will be disabled and the shift solenoid control means 126 which were energized to cause the gear change operation will remain energized.

Figure 4:
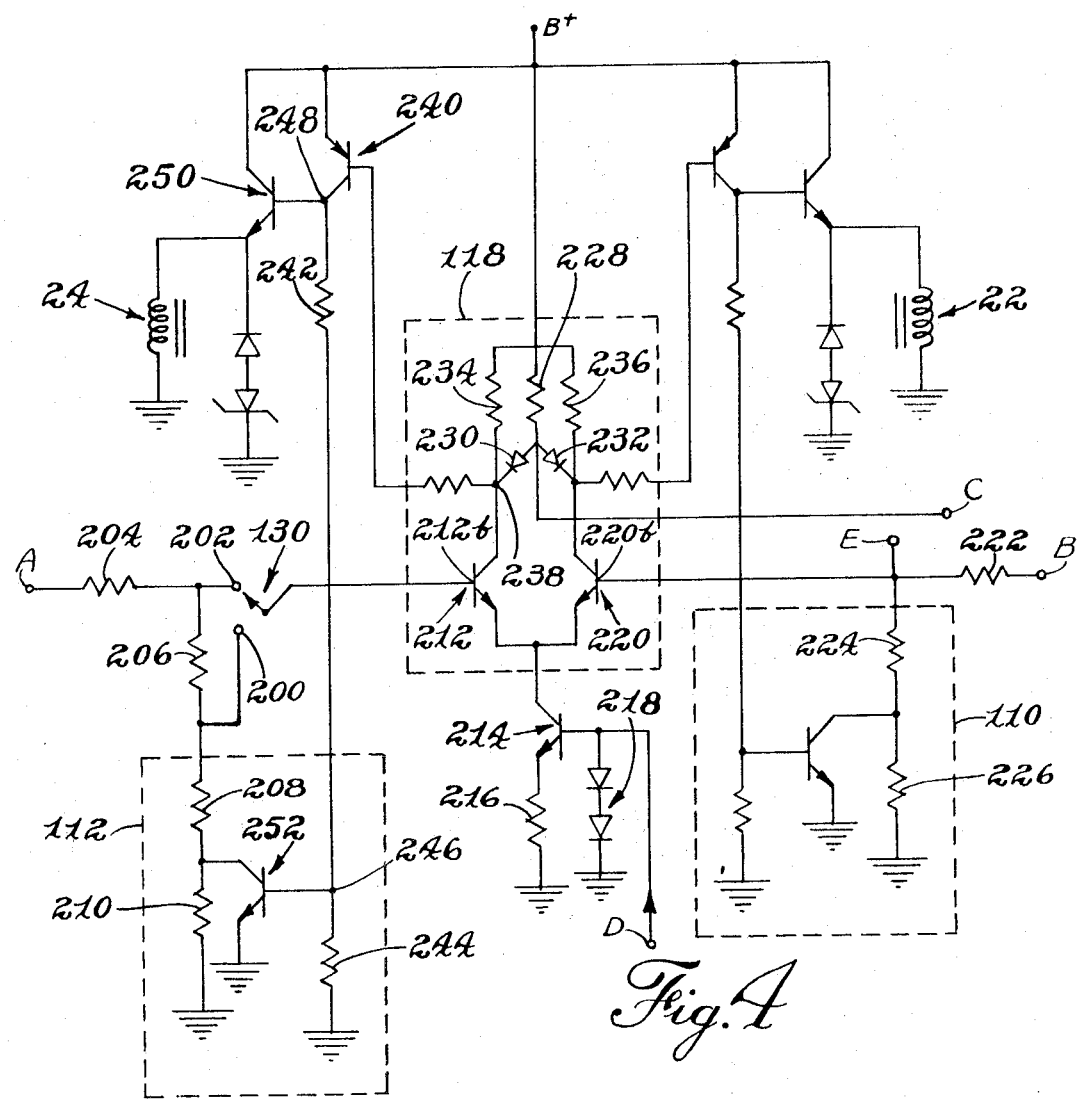
FIG. 4 shows a circuit schematic of the anticipation and threshold circuits of a portion of the FIG. 3 block diagram.

Referring now to FIGS. 3 and 4, and particularly to FIG. 4, the synchronism anticipation and threshold detector control of the accelerating and decelerating devices will be described. The terminals lettered A, B, C, and D in FIG. 4 correspond to the similarly designated locations in FIG. 3 and the commonly-identified components in FIGS. 3 and 4 also correspond. For convenience, the figure will be described in a functional manner assuming as an initial condition that the most recent previous shift was sufficiently remote in time to permit the circuit to achieve a passive state while voltages representative of the shaft speeds are being received at points A and B.

For an appropriate shifting operation, gear selector switch 130 will move from contact 200 to contact 202. Due to the voltage divider effect of the resistive path of resistors 204, 206, 208, 210, the voltage applied to the base 212b of transistor 212 will increase. The circuit will remain inactive until a voltage signal is applied at location D indicative that the shift control logic 128 is prepared to complete the shift. Receipt of this signal will switch on the transistor 214 whereby the transistor 214 and its associated resistor 216 and diode means 218 become a constant current source drawing current out of the threshold detector 118.

The threshold detector 118 is comprised of an emitter-coupled pair of transistors 212 and 220 and associated resistors and diodes. As is the nature of emitter-coupled pairs of transistors, only one will be conductive at a time, that one being the one with the highest base voltage. Base 220b of transistor 220 is receiving a signal indicative of counter-shaft 16 speed, modified by the voltage divider effect of resistors 222, 224, and 226 while base 212b receives a signal indicative of the speed of the input shaft, modified by the voltage divider effect of resistors 204, 206, 208 and 210 and the particular gear setting of the selector switch 130. For the sake of this description, assume that input shaft 12 is rotating sufficiently fast that with the gear selector switch contacting contact 202, the voltage at base 212b will be higher than that at base 220. This will cause transistor 212 to be conducting so that current is drawn from the source at B+ down through resistor 228 and diode 230 and resistor 234. Current flow lowers the potential at circuit point 238 which causes transistor 240 to go into conduction thereby causing current to flow through resistors 242 and 244 and elevating the voltage at circuit locations 246 and 248. This elevated voltage will, in turn, cause transistors 250 and 252 to go into conduction so that braking device 24 is energized and resistor 210 is shorted to ground.

Energization of braking device 24 will cause the speed of the input shaft 12 to be braked so that it attempts to synchronize with counter-shaft 16. This will begin to lower the voltage at point A and at base 212b. Shorting out of resistor 210 will further lower the voltage at base 212b thus providing the anticipation of synchronization.

When the voltages at the bases 212b and 220b are equal, transistor 220 will begin to turn on and transistor 212 will begin to turn off. This will produce a momentary voltage spike between the resistor 228 and the diodes 230 and 232 which will be transmitted through location C to the shift control logic means 128. The shift control logic means 128 will then terminate the signal at D and the current source will be extinguished thereby deactivating, or disabling, the threshold detector 118, the synch anticipators 110 and 112, and the braking device 24.

The braking device 22 would be activated in much the same manner if the threshold detector determines that the speed signals received at the bases 212b and 220b are indicative of counter-shaft 16 speed in excess of the speed of the input shaft 12. Energization of either braking device 22, 24 will be seen to automatically enable the associated synchronism anticipator to provide the synch signal sufficiently in advance of actual synch to permit actuation of all necessary devices to accomplish the gear change operation. It will be readily apparent that the above described circuit provides a reliable means of anticipating synchronization of the shaft speeds and that such synchronization will be repeatable. The system as described hereinabove has the further advantage that it is directly responsive to shaft speeds rather than to an artificial signal which could easily be non-representative after a period of use. Furthermore, the need for adjustment of the braking devices 22, 24 is minimized since direct speed readings are utilized.

Figure 5:
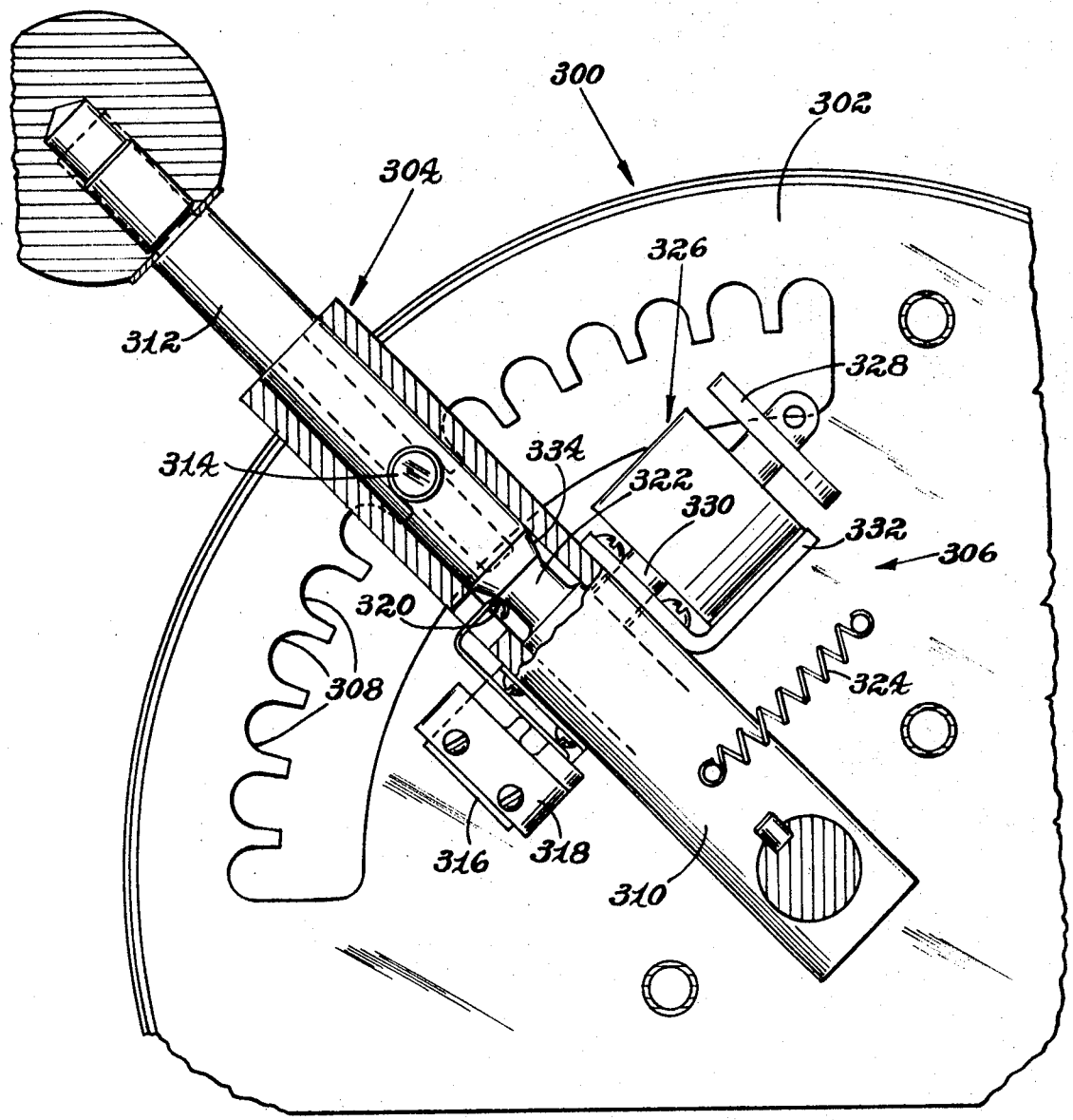
FIG. 5 shows a partially broken-away elevation of a gear-change lever according to the present invention including means for correcting a prohibited shift.

Referring now to FIG. 5, the shift control lever of the present invention is shown generally as 300. The control lever 300 includes a housing 302, a pivotal lever means 304, and a prohibited shift correcting means 306. The housing 302 includes a plurality of detents which are adapted to receive a portion of the lever means 304 to stabilize the pivotal position thereof with respect to the housing 302.

The shift lever means 304 is comprised of a pivotal member 310 which telescopically receives a depressible member 312. A locking pin 314 is arranged to be carried by the depressible member 312, into and out of selected ones of the plurality of detents 308. The pivotal member 310 carries, by way of frame 316, a switch 318 which is actuated by resilient member 320. Whenever the depressible member 312 is depressed, relative to the pivotal member 308, resilient member 320 is forced out of recess 322 and switch 318 is actuated. The switch 318 produces a signal to indicate that a shift is desired.

The correcting means 306 is comprised of a resilient means, shown here as spring 324, and electromagnetic solenoid 326 having armature 328 and plunger 330 carried on the pivotal member 310 by bracket 332. In this embodiment, the shift control lever 300 can be placed in any of a plurality of settings corresponding to the detents 308. Each setting in turn corresponds to a transmission power transfer ratio (or gear) with the right-ward detents representing lower transfer ratios (higher gears) and the leftward settings indicating reverse, neutral, and high transfer ratios (lower gears). The correcting means 306 is arranged in the present embodiment to prevent downshifts which would overspeed the associated engine.

In order to accomplish a shift, the depressible member 312 must be depressed to release pin 314 from the detent. Ramp surface 334 on the depressible member will cause resilient member 320 to actuate switch 318 to inform the control circuit 100 (FIG. 3) that a gear change is desired. Further depression of lever 312 will bring recess 322 into registry with plunger 330. When locking pin 314 has cleared the detent, the shift lever 304 may be pivoted to the position corresponding with the desired gear setting. If that setting would constitute a prohibited shift, the solenoid is actuated and the plunger 330 is drawn into recess 322 thereby preventing the member 312, which may be resiliently biased outwardly by resilient means within member 310, from outward movement. Since pin 314 will be clear of the detents 308, the resilient means 324 can urge the shift lever 304 towards a higher gear setting. When the angular position corresponds with a permissible gear selection, the solenoid will be deactivated and the pin 314 will be urged into the detent 308 representing the closest permissible gear setting to the one originally selected.

Figure 6:
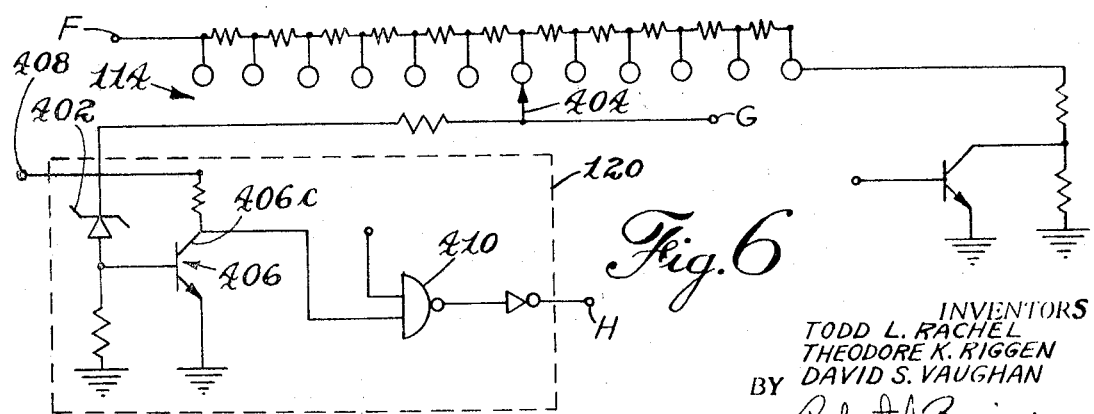
FIG. 6 shows a circuit diagram of the shift inhibit circuit of the FIG. 3 block diagram for actuating the shift correcting means of FIG. 5 shift lever.

Referring now to FIGS. 3, 5 and 6 and particularly to FIG. 6, the shift inhibitor 120 will be described. The terminals bearing letter designations correspond to the similarly identified locations in FIG. 3 and commonly-number components also correspond. Circuit location F receives a signal, in the form of a voltage, which is reduced by the voltage divider 114 so that movable contact 404 receives a voltage representative of output shaft 14 speed modified by selected gear. This signal is applied to the threshold detector 116 through circuit location G. It is also applied to the cathode of Zener diode 402. As the contact 404 is moved along the sequence of terminals the signal is incrementally changed, with motion of the contact to the right (relative to the figure) being indicative of a higher gear setting and producing a proportionately lower voltage. Leftward movement indicates a lower gear setting and a greater proportion of the voltage signal at F is then applied to the Zener diode 402. A prohibited shift would, in this instance, be one in which the contact 404 has been moved leftward thereby applying a higher percentage of the F location voltage signal to the Zener diode 402 while the signal at F is sufficiently large that the signal applied to the Zener diode 402 exceeds the Zener breakdown voltage. Reverse direction current flow through the diode 402 will turn transistor 406 on thereby drawing current from terminal 408 which communicates with the solenoid 326. Current flow through terminal 408 will cause solenoid 326 to be energized thereby preventing locking of the shift lever 304 and concurrently causing the voltage at collector 406c of transistor 406 to drop to a very low value. Terminal 406c communicates with AND gate 410 and a low voltage at terminal 406c is equivalent to a zero signal at the AND gate. This causes the signal at terminal H to be a zero signal, informing the shift control logic 128 that a shift is not presently permitted. The other input to the AND gate 410 communicates with switch 318 so that the AND gate 410 and hence, the shift control logic 128 remain disabled except when the lever 312 is depressed. When the contact 404 has been drawn rightward so that the voltage at the Zener diode 402 is reduced below the diode breakdown voltage, the transistor 406 will become non-conducting, current will cease to flow in the solenoid 326 and the voltage at collector 406c will rise causing a positive signal at terminal H. This signal will then initiate the gear change sequence.

We claim:

1. A control system for supervising the controlled shifting of a transmission having a plurality of shafts and a plurality of selectable gear connections between said shafts wherein there exists a response time delay between the start of a shift and the completion of the shift comprising:

means for producing a plurality of signals indicative of the speeds of said plurality of shafts;

means for modifying at least one of said signals to correspond to a selected gear connection;

detector means for comparing a pair of said signals, including said at least one modified signal, operative to indicate which of the pair of shaft represented by said signals is rotating at a faster speed;

means responsive to said detector means indication operative to cause the pair of shafts to seek synchronized rotation; and anticipatory means responsive to said detector means indication operative to vary one of said pair of signals to cause a synchronization signal to be produced sufficiently in advance of actual synchronization to thereby compensate for response time delays.

2. The system as claimed in claim 1 including further: shift inhibit means responsive to one of said plurality of signals operative to prevent a prohibited shift.

3. The system as claimed in claim 1 wherein: said signal modifying means comprise a signal divider means for providing a sequential variation of said at least one signal; and said anticipatory means comprise by-pass means for selectively eliminating a portion of said divider means whereby said at least one signal is selectively altered.

4. A shift control for an automatically shifted gear type transmission having a plurality of gear ratios comprising:

a housing;

shiftable means within said housing, movable to a plurality of positions relative to said housing operative to indicate a selected gear ratio; and prohibited shift correcting means operative to prevent movement of said shiftable means to a prohibited position and further operative to urge said shiftable means to the closed permitted position.

5. The shift control as claimed in claim 4 wherein said shift correcting means comprise:

electromagnetic latching means operative to prevent completion of any shiftable means movement to a prohibited position; and resilient means operative to urge said shaftable means towards a permitted position.

References Cited

UNITED STATES PATENTS

| | | | |
|---|---|---|---|
| 2,986,045 | 5/1961 | Peras | 74—866 |
| 3,181,387 | 5/1965 | Baier et al. | 74—866 |
| 3,301,085 | 1/1967 | De Castelet | 74—866 |
| 3,402,793 | 9/1968 | Scholl | 192—3.5 X |
| 3,439,564 | 4/1969 | Scholl et al. | 74—365 X |
| 3,446,097 | 5/1969 | Schmidt et al. | 74—339 X |
| 3,478,851 | 11/1969 | Smyth et al. | 74—866 X |

ARTHUR T. McKEON, Primary Examiner

U.S. Cl. X.R.

74—339 (Discl), 866 (Discl)